United States Patent [19]

Goss et al.

[11] Patent Number: 4,655,608
[45] Date of Patent: Apr. 7, 1987

[54] NON-PERTURBING BEAM DEFLECTION SYSTEM AND METHOD FOR HIGH REPETITION RATE TEMPERATURE MEASUREMENT OF COMBUSTION FLAMES

[75] Inventors: Larry P. Goss, Beavercreek; Dennis F. Grosjean, Kettering; Benjamin Sarka, Jr., Enon; Sigmund W. Kizirnis, Centerville; Biswa N. Ganguly, Beavercreek, all of Ohio

[73] Assignee: The United States of America as represented by the Secretary of the Air Force, Washington, D.C.

[21] Appl. No.: 790,714

[22] Filed: Oct. 24, 1985

[51] Int. Cl.$^4$ .............................................. G01L 11/24
[52] U.S. Cl. ................................... 374/119; 374/117; 374/144
[58] Field of Search .................. 374/117, 119, 8, 144, 374/118; 181/122, 108, 142; 367/140, 149, 151

[56] References Cited

U.S. PATENT DOCUMENTS

| | | | |
|---|---|---|---|
| 3,978,713 | 9/1976 | Penney | 374/117 |
| 3,983,424 | 9/1976 | Parks | 374/117 |
| 4,169,662 | 10/1979 | Kaule et al. | 367/140 |
| 4,265,122 | 5/1981 | Cook et al. | 367/140 |
| 4,422,167 | 12/1983 | Shajenko | 367/149 |
| 4,468,136 | 8/1984 | Murphy et al. | 374/45 |

OTHER PUBLICATIONS

Zapka W. et al., "Noncontacting Optoacoustic Monitoring of Flame Temperature Profiles", Optics Letters, vol. 7 No. 10, Oct. 1982, pp. 477-479.

Tennal K. et al., "Minority Species Concentration Measurements in Flames by the Photoacoustic Technique", Applied Optics, vol. 21, No. 12, Jun. 15, 82, pp. 2133-2140.

*Primary Examiner*—Charles Frankfort
*Assistant Examiner*—Thomas B. Will
*Attorney, Agent, or Firm*—Bobby D. Scearce; Donald J. Singer

[57] ABSTRACT

A novel laser beam deflection system and method for temperature measurement of combustion flames of known composition is described which comprises a thin wire for placement at a predetermined location within the flame; a pulsed laser source for directing a pulsed beam onto the wire for heating the wire and immediately surrounding gases of the flame to produce an acoustic pulse in the flame; a pair of probe laser sources for directing parallel probe beams through the flame in predetermined spaced relationship to each other and to the wire, and a pair of detectors and associated electronics for detecting the respective deflections of the probe beams resulting from interactions with the pulse and measuring the time difference between respective deflections of the probe beams to determine the speed of the acoustic pulse through the flame and the temperature of the flame from the speed determination.

13 Claims, 9 Drawing Figures

NON-PERTURBING BEAM DEFLECTION SYSTEM AND METHOD FOR HIGH REPETITION RATE TEMPERATURE MEASUREMENT OF COMBUSTION FLAMES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for combustion flame diagnostics, and more particularly to a novel non-perturbing acoustic system and method for flame temperature measurement.

The availability of tunable, high-peak-power laser sources has recently promoted the development of new techniques for combustion diagnostics relative to the identification of basic fluid and chemical properties of combustion. Techniques such as Raman, nonlinear Raman and laser induced fluorescence have been applied to thermometry of reacting flow systems. The extension of these techniques to high frequencies has suffered from the lack of high-repetition-rate, high-peak-power laser sources. High frequency thermometry has, to date, been carried out using fine-wire thermocouples or Rayleigh scattering. Both methods are extremely difficult to apply to a practical flame system.

An optoacoustic technique applied by prior workers in the field (W. Zapka et al, "Noncontact Optoacoustic Monitoring of Flame Temperature Profiles", Opt Lett 7, 477 (1982)) involved determination of flame temperature by measurement of the velocity of an intense sound pulse from a plasma spark created by focusing an intense laser beam (Nd:YAG, 1064 nm, 10-ns) on the flame to effect gas breakdown. Two spaced laser probe beams monitored the speed of the sound pulse over a distance defined by the spacing between the probe beams. The time between deflections of the two beams corresponds to the difference in arrival time of the pulse. After correction for gas flow velocity in the flame, the acoustic velocity and coresponding temperature were determined. The spark and blast wave generated by gas breakdown within the flame of the Zapka et al method require a high power laser, thereby limiting choice of excitation source, and substantially disrupts the flow within the flame, resulting in ignition of unburned fuel and air mixtures in the gases and consequent uncertainties or errors in flame temperature measurements.

The present invention overcomes disadvantages in the techniques of the prior art by providing a non-contact optoacoustic laser deflection thermometric method and system which causes no significant perturbation of flame medium during temperature measurement, while allowing localized temperature measurements within practical combustion flame environments at a repetition rate greater than the turbulence frequency of the flame. A small wire is disposed within the flame and pulsed with a low power laser pump beam, the absorption of which by the wire produces localized heating of the wire which heats the immediately surrounding gases of the flame, resulting in a pressure increase and acoustic pulse within the flame. The acoustic pulse travels outwardly in the flame, resulting in a change in the refractive index of the medium of the flame. Two parallel laser probe beams are directed through the flame between which the propagation velocity of the pulse is measured which provides a measure of the temperature of the combustion gas in the flame.

The acoustic wave generation process temperature measurement method of the present invention is nonintrusive, is substantially independent of wavelength, and high repetition measurement rates (5 kHz or more) may be achieved using commercially available lasers, detectors and data acquisition equipment.

It is, therefore, a principal object of the present invention to provide novel non-perturbing acoustic method and system for flame temperature measurement.

It is a further object of the invention to provide a non-intrusive method and system for accurate and repetitive high speed temperature measurement of combustion flames.

These and other objects of the invention will become apparent as the detailed description of representative embodiments thereof proceeds.

SUMMARY OF THE INVENTION

In accordance with the foregoing principles and objects of the invention, a novel laser beam deflection system and method for temperature measurement of combustion flames of known composition is described which comprises a thin wire for placement at a predetermined location within the flame; a pulsed laser source for directing a pulsed beam onto the wire for heating the wire and immediately surrounding gases of the flame to produce an acoustic pulse in the flame; a pair of probe laser sources for directing parallel probe beams through the flame in predetermined spaced relationship to each other and to the wire, and a pair of detectors and associated electronics for detecting the respective deflections of the probe beams resulting from interactions with the pulse and measuring the time difference between respective deflections of the probe beams to determine the speed of the acoustic pulse through the flame and the temperature of the flame from the speed determination.

DESCRIPTION OF THE DRAWINGS

The present invention will be more clearly understood from the following detailed description of representative embodiments thereof read in conjunction with the accompanying drawings wherein.

DETAILED DESCRIPTION

The velocity of an acoustic pulse propagating through a flame is dependent upon the temperature of the flame, the relationship between temperature and propagation velocity being, $$T = V_o^2 m/R[1 + R/C_v(T)] \quad (1)$$

where m is the average molecular weight of the gases in the flame, R is the universal gas constant, $V_o$ is the sound velocity, and $C_v(T)$ is the temperature dependent average molar specific heat at constant volume in the flame.

The solution of Equation (1) for temperature T requires that m and $C_v(T)$ be known. In a premixed propane air flame, the main gaseous components, other than propane and oxygen, are nitrogen, carbon dioxide, and water vapor. An adiabatic flame code can be used to yield the gaseous composition of the flame as a function of temperature from which m and $C_v(T)$ may be calculated to define a temperature from a corresponding sound velocity measurement. However, to a first approximation the composition of the flame may be taken as constant with temperature, and from a ratio of the velocity measured at in the flame to that at ambient conditions, a temperature can be determined, viz., $$T_f/T_a = (V_f/V_a)^2 K_f/K_a \quad (2)$$

where subscripts a and f denote ambient and flame conditions, respectively, and the constants $K_a, K_f$ incorporate the masses and specific heats. If the gas velocity is small compared to the speed of sound, i.e., less than about 20 m/sec, then the respective transit times of the sound pulse may be used:

$$T_f/T_a = (\Delta t_a/\Delta t_f)^2 K_f/K_a \quad (3)$$

where $\Delta t_a$ and $\Delta t_f$ are the measured times required for the acoustic pulse to travel between the two probe beams with and without the flame. The dependence of the sound velocity on the average molecular weight and specific heat must be taken into account to ensure highly accurate measurements. However, to a good approximation only a small underestimate of the correct value for $T_f$ may be obtained for most flame temperature measurements by neglecting the difference between $K_f$ and $K_a$ (i.e., letting $K_f = K_a$), as compared to Equation (1) which uses the appropriate m and $C_v(T)$ values.

Figure 1:
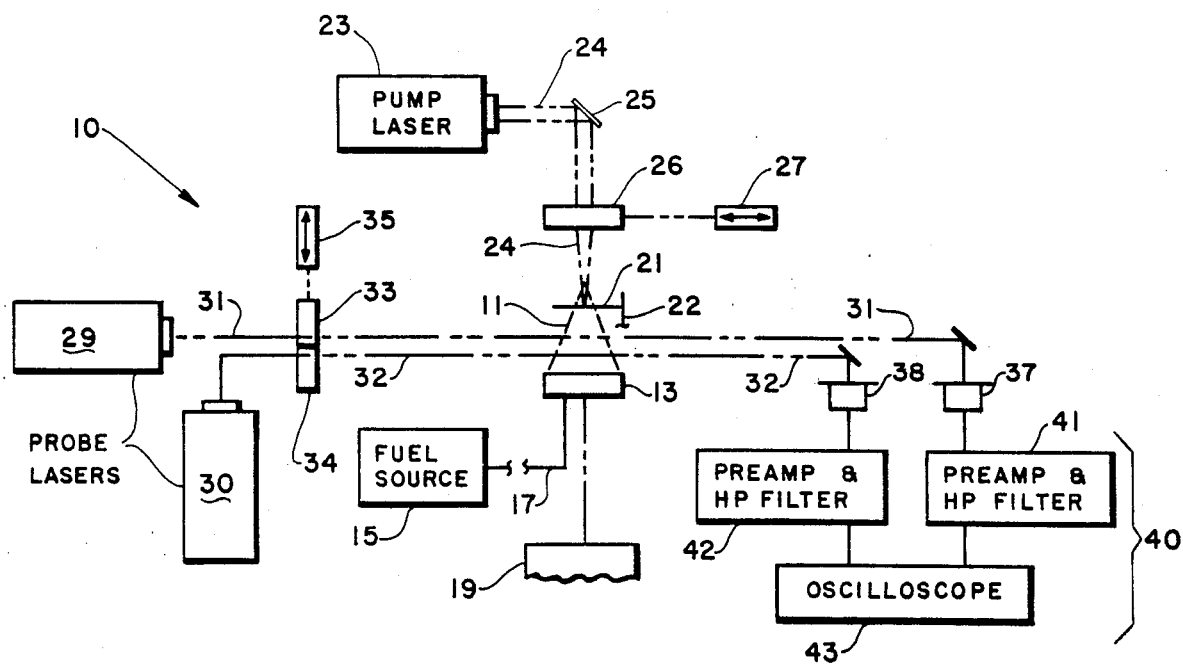
FIG. 1 is a schematic of a system for optoacoustic wave generation and detection for temperature measurements according to the present invention.

Referring now to FIG. 1, shown therein is a schematic layout of a system 10 for optoacoustic wave generation and detection useful in the high repetition rate temperature measurement method of the present invention. Combustion flame 11 supported on burner head 13 was used for temperature measurements in accordance with and in demonstration of the invention. Flame 11 was fueled by fuel source 15 operatively connected to burner head 13 through conventional conduit and supply means 17. Burner head 13 may be mounted on a motor driven X-Y translator 19 to permit movement of flame 11 and burner head 13 in horizontal and vertical planes. A small wire 21 was positioned at a preselected location within flame 11 using a suitable support 22. In system 10 used in demonstration of the invention, burner head 13 was about three inches in diameter and was fabricated of stainless steel. Fuel source 15 comprised propane and was fed to burner head 13 in a fuel rich mixture of propane and air with an equivalence ratio of about 1.48. Flame 11 was allowed to extend approximately seven inches above burner head 13. A chimney (not shown) was used to help stabilize flame 11, but greatly limited the accessibility of the upper part of flame 11 for optical measurements. Therefore, some measurements according to the invention as herein described were taken without the chimney, which resulted in some instability of flame 11. Flame 11 instability may be avoided through the use of a transparent quartz chimney.

Pump laser 23 was positioned within system 10 to direct output beam 24 onto wire 21 within frame 11. Accordingly, suitable mirrors 25 and focusing lens system 26 comprising an optical train, operatively connected to a beam translator 27, were provided to selectively focus beam 24 onto wire 21. The wavelength of beam 24 is not critical since the purpose of the beam pulse from laser 23 is to generate localized heating of the target comprising wire 21. Beam 24 may be shaped and focused in suitable manner to result in a desirable shape for the acoustic pulse. However, for high repetition measurement rates with minimum flame perturbation, the temporal pulse width of beam 24 should be short (less than about 100 ns). In measurements taken as herein described, pump laser 23 comprised a Quanta-Ray Nd:YAG laser (about 10 mJ per pulse) having the 532 nm output beam 24 therefrom frequency doubled and mildly focused on target wire 21. Other pump lasers usable within the teachings of the present invention may include XeCl (308 nm), nitrogen, (337.1 nm), or copper vapor (510.6 and 578.2 nm).

In the measurement of the velocity of an acoustic pulse traveling through flame 11, wire 21 was pulsed by pump laser 23 to generate acoustic pulses. Absorption by wire 21 of pulses of beam 24 produces localized heating of wire 21 which heats the immediately surrounding gases in flame 11, giving rise to a pressure increase in the form of an acoustic pulse which travels outwardly in flame 11, causing a change in the refractive index of the medium comprising flame 11. The amplitude of the pulse is linearly dependent on the absorption coefficient of the material comprising wire 21, dependent on the inverse of the specific heat of the material, linearly dependent on laser 23 power, and inversely dependent on beam 24 pulse width (which dictates use of a short pulse laser).

Material and size selection for wire 21 is not critical so long as the volumetric expansion coefficient of the flame medium surrounding wire 21 is such to allow the material comprising wire 21 to couple energy rapidly to the surrounding medium (viz., flame 11) when wire 21 is heated by beam 24, and so long as the wire 21 material may be shaped or otherwise configured to not physically interfere with or perturb the environment of flame 11 at the point within flame 11 at which acoustic pulse velocity measurements are made. Accordingly, in system 10 of FIG. 1, wire 21 comprised a small 500 micron diameter tungsten wire disposed from about two to about five centimeters above the intended measurement point within flame 11. Other wire 21 material useable within the scope of the teachings herein includes titanium, aluminum titanium alloy, nickel, stainless steel, copper, brass, and aluminum.

Two probe lasers 29,30 were positioned within system 10 to direct the respective output beams 31,32 thereof parallel to each other through flame 11 at a preselected region therein where measurement of velocity of the acoustic pulse from wire 21 by observation of respective deflections of beams 31,32 was intended. Accordingly, suitable optical components comprising optical trains 33,34 to which may be connected beam translator 35 may be provided to focus and direct beams 31,32 in predetermined parallel fashion through the preselected region within flame 11. Conventional laser devices of wide selection may be used as probe lasers 29,30, as would occur to one with skill in the field guided by these teachings, and, accordingly, laser type is not critical to the present invention. In system 10 used in demonstration of the invention and in taking temperature measurements according to the method of the invention, probe lasers 29,30 comprised a pair of 8 mW HeNe lasers. Probe laser selection is not critical since the wavelength of beams 31,32 is not critical, and, therefore other sources may be selected within the scope of these teachings so long as the source is characterized by sufficient power such that a high-speed transient is detectable, sufficiently low noise in the frequency range of the transient, and sufficiently small beam waist in the detection region to define the location of the deflections and, consequently, the separation of the measurement points. Accordingly, probe lasers 29,30 may comprise HeNe (632.8 nm), or diode (800 nm), as would occur to one skilled in the applicable art. Each laser source 29,30 provided 2 mW CW beams 31,32 at 632.8 nm spaced 2 nm apart, mildly focused in ambient air by optics 33,34, and directed through flame 11 at the intended measurement point upstream of the position of wire 21 comprising the acoustic source in order to minimize flow disturbances within the probe region. Probe laser 29,30 selection and representative spacing for beams 31,32 resulted a spatial resolution of about 0.5 $nm^3$ and a deflection signal of 0.2 volts. Beams 31,32 were imaged onto respective position sensitive pin diode detectors 37,38 substantially as illustrated in FIG. 1, which, together with suitable data analysis equipment described below for processing signals from detectors 37,38 provided means to compare the effects of the acoustic pulse on beams 31,32. Pin diode detectors 37,38 may be that known as model MRD 500 fabricated by Motorola.

Data recording and analysis in the practice of the invention may be performed in a variety of ways using commercially available data acquisition and processing equipment. As suggested in FIG. 1, which displays one representative embodiment, data analysis and recording system 40 may comprise preamplifier and high pass filter systems 41,42 operatively connected to respective diodes 37,38 and oscilloscope 43 to record responses of probe beams 31,32 to acoustic pulses generated by wire 21 pulsed by beam 24.

Figure 2:
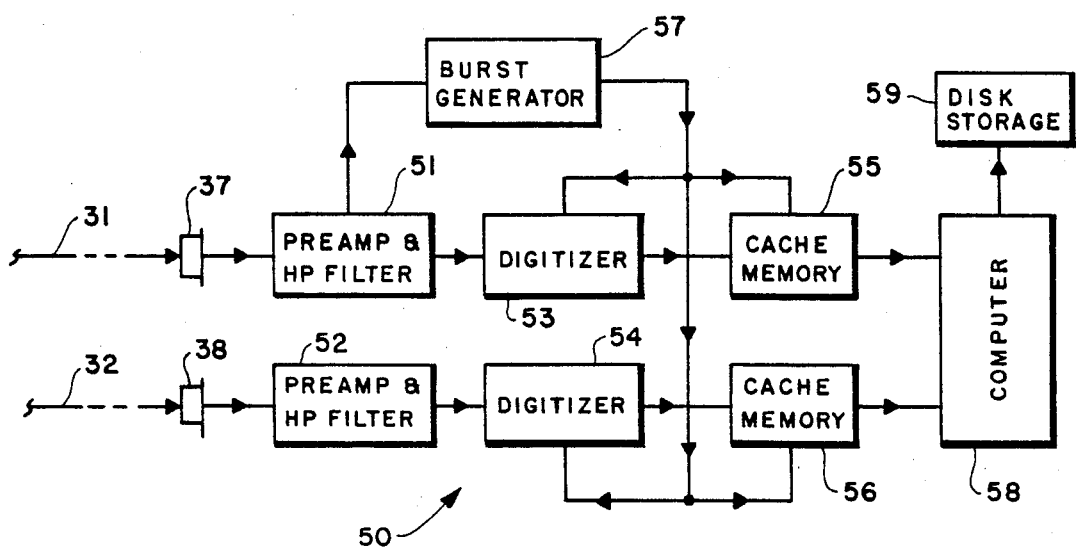
FIG. 2 is a diagram of a probe beam waveform recording system for measurement of velocity of the acoustic pulse.
Figure 3:
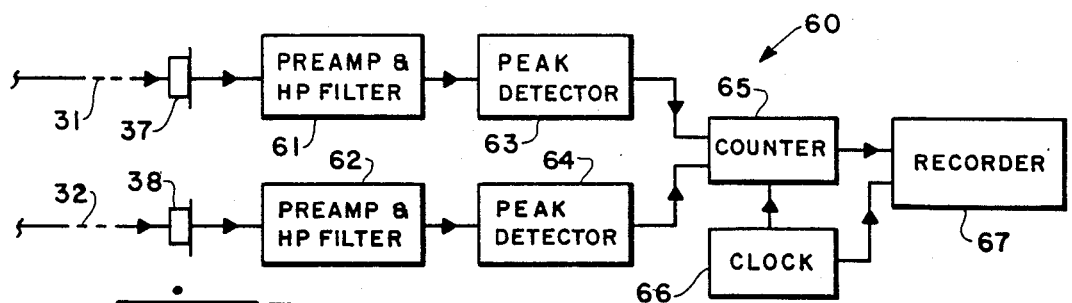
FIG. 3 is a diagram of a real time measurement and recording system for measurement of velocity of the acoustic pulse.

Recording to diode detector 37,38 responses to probe beam 31,32 deflections may be alternatively accomplished by either of systems 50,60 shown schematically in FIGS. 2 and 3, respectively. FIG. 2 is a block diagram of a probe beam waveform recording system 50 useful in the acquisition of data in acoustic pulse velocity measurements according to the present invention. Using system 50, the entire waveforms of both probe beams 31,32 may be recorded and subsequently processed. Preamplifier and high pass filter systems 51,52 may be operatively connected to respective diode detectors 37,38 similarly to system 40 of FIG. 1. Conventional digitizer systems 53,54 and associated cache memory modules 55,56 (such as LeCroy model 8818 transient digitizer, with associated MM8103A memory modules) may be operatively connected in line. Burst generator (clock) 57 running at a preselected frequency of 25, 50 or 100 MHz is triggered by the leading edge of the waveform of the first probe beam 31. A preselected number of pulses (512 to 2048) effects simultaneous digitization of the two waveforms by digitizers 53,54. The number of waveforms which may be analyzed is limited only by the size of cache memories 55,56, and the waveform repetition rate is limited only by that of pump laser 23. After cache memories 55,56 are filled, data acquisition ceases and the digitized data are transferred to computer 58 (HP 9836) and to storage 59 for later processing. Computer software can then be used to extract for each acoustic pulse an accurate travel time between probe beams 31,32.

FIG. 3 is a block diagram of real time measurement and recording system 60 useful for data acquisition in the method of the present invention. Using system 60, real time measurement and recording is made of the time difference between a selected point on the waveform of one of the beams 31,32 and a corresponding point on the waveform of the other beam. Peak detectors 63,64 are operatively connected in line to respective preamplifier and high pass filter systems 61,62, and are configured to "arm" on a preselected slope, corresponding to the leading edge of the acoustic pulse waveforms presented by beams 31,32. The peak of the waveform of the first probe beam 31 triggers counter 65 and the peak of the waveform of the second probe beam 32 stops the count. Clock 66 operates substantially similar to that of the FIG. 2 embodiment. The number of counts and the frequency of clock 66 are stored by recorder 67, and counter 65 is reset in time for the process to be repeated upon arrival of the next set of waveforms from detectors 37,38. Considering the availability of high speed recorders, the repetition rate is limited only by that of pump laser 23. Using system 60, the number of successive data points can be much larger than with system 50, but the accuracy is dependent upon the real time analog processing of the circuitry of peak detectors 63,64.

Figure 4A:
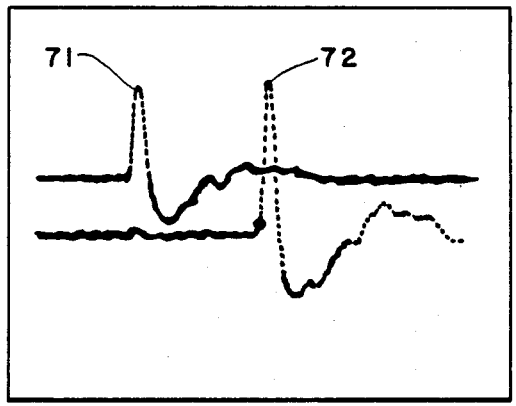
FIGS. 4a and 4b represent example optoacoustic deflection signals for probe beams in room air and a propane air flame.
Figure 4B:
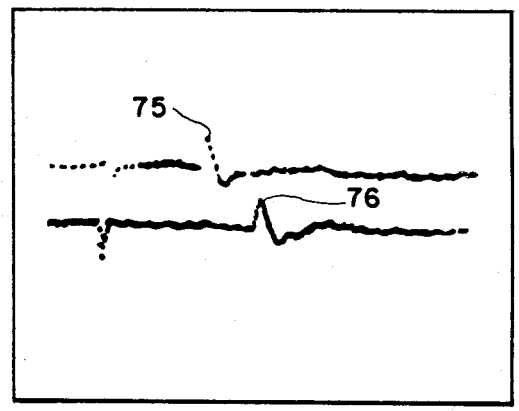
Figure 5:
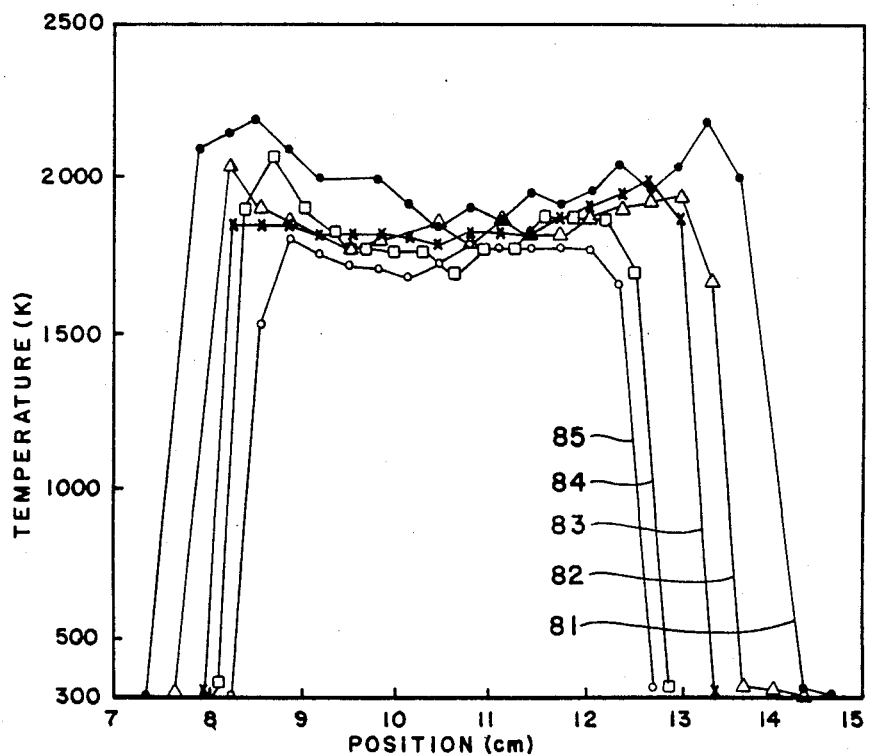
FIG. 5 presents average temperature profiles taken in propane air flame by the optoacoustic technique of the present invention.

Representative photoacoustic deflection signals for probe beams 31,32 obtained according to the method of the invention in room air and in a propane and air fueled flame 11 are shown in FIGS. 4a and 4b, respectively. The arrival of the acoustic pulse in air at beams 31,32 is evidenced by the respective peaks 71,72 of FIG. 4a, and in flame 11 by the respective peaks 75,76, the difference between each set of peaks being a measure of the transit time for the acoustic pulse over the distance represented by spacing between beams 31,32. A drop in amplitude of the acoustic signal with increased temperature is evident from a comparison of FIG. 4a with FIG. 4b, and is due to the lower number density of the medium of flame 11 at the higher temperature. The width of the acoustic deflection (i.e., width of each peak 71,72,75,76) is primarily determined by the transit time of the acoustic pulse across the width of each probe beam 31,32. Focusing of probe beams 31,32 as described above resulted in improved beam definition, accurate beam spacing, and increased time resolution (spatial resolution) of the acoustic measurement. The acoustic deflection signals were recorded on a transient digitizer (FIG. 2) which allowed the acoustic transit time to be determined. Both single shot and averaged transit times recorded and compared. FIG. 5 shows temperature profiles of a premixed propane air flame 11 obtained for various heights in flame 11 above the supporting burner head. For the data presented, plots 81,82,83,84,85 correspond to respective heights of 5, 10, 15, 20 and 25 mm above the burner head. The temperature profile across flame 11 was essentially constant, with a slight drop in temperature at the center. As flame 11 is profiled at different heights above the burner, the temperature results clearly reveal the narrowing of the flame along with a gradual drop in temperature.

Figure 6A:
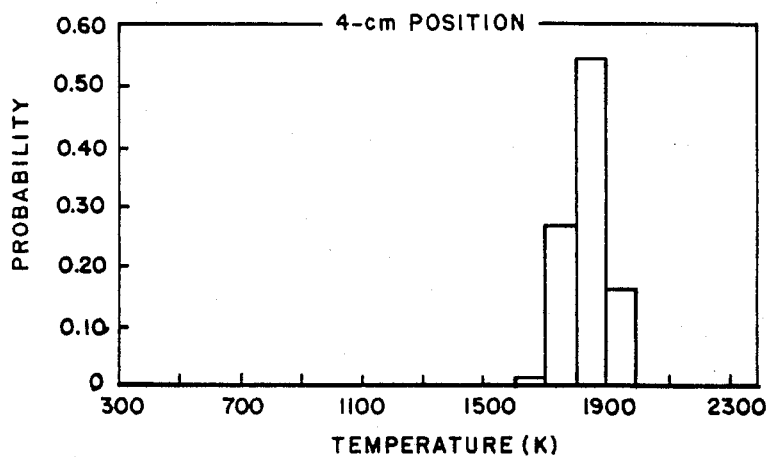
FIGS. 6a, 6b, and 6c present probability functions for flame locations 4, 7, and 11 cm above the burner surface.
Figure 6B:
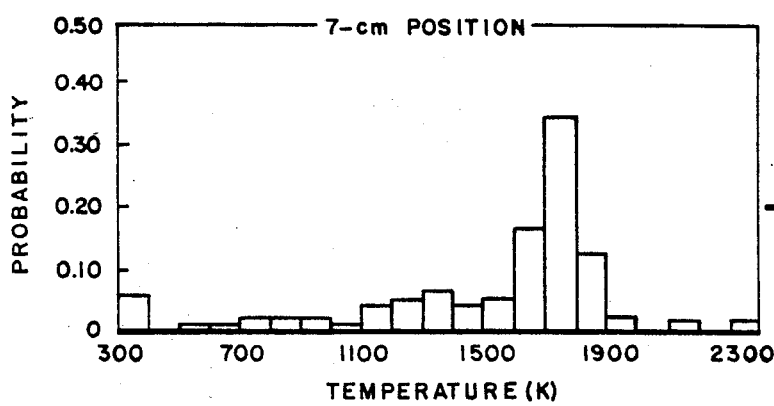
Figure 6C:
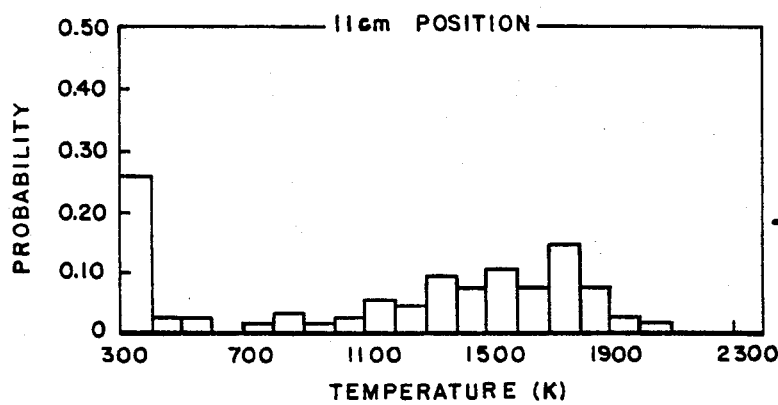

To demonstrate that the beam steering of the flame did not adversely affect the temperature measurements, three sets of 100 single-slot temperatures were taken above a flickering flame without the use of a stabilizing chimney. The resulting temperature probability distribution functions are shown in FIGS. 6a,6b,6c for respective distances of 4, 7, and 11 cm above the burner surface. At the lowest measurement position (4 cm) in the flame, a single mode function was observed (FIG. 6a) with an average temperature of 1831±67° K. At 7 cm (FIG. 6b), the corresponding function shows bimodal distribution, and the average temperature of the flame is 1525° K. At 11 cm (FIG. 6c), a distinctive bimodal distribution is observed with an average temperature of 1196° K. The index of refraction gradients in the upper part of the flame are severe due to the large temperature variation which occurs there. However, electronic filtering of the signal which blocks the low frequency fluctuations below 10 kHz and passes the higher frequencies associated with the acoustical signal (500 kHz) allows the acoustic signals to be measured without interference from flame 11 turbulence.

The method of the present invention therefore yielded consistent reliable temperature measurements, and the results obtained for the premixed propane air flame compared favorably with the Coherent Anti-Stokes Raman Spectroscopy (CARS) technique for temperature measurements and with theoretical predictions. For known stoichiometry, the precision of the method of the invention is comparable to CARS for high temperature measurements, but may be substantially superior to CARS at low temperatures. For example, the optoacoustic method of the present invention provided a temperature measurement of 1950° K. at a position five mm above the burner surface, while the CARS technique indicated 1970° K., where theoretical predictions, considering stoichiometry of the flame (equivalence ratio of 1.48), yield 1968° K. The presence of wire 21 therefore caused no significant perturbation of flame 11 at the site of measurement between beams 31,32.

The present invention therefore provides novel method and system for high repetition rate temperature measurement of combustion flames using lasers. The optoacoustic deflection method described is useful in the measurement of flame temperature in both laminar and turbulent flame environments of known composition, is relatively simple to implement, does not require a high peak power pulsed laser as with certain prior art methods, and may potentially be extended to the analysis of high frequency temperature fluctuations. It is understood that certain modifications to the invention as described may be made, as might occur to one with skill in the field of this invention, within the scope of the appended claims. Therefore, all embodiments contemplated have not been shown in complete detail. Other embodiments may be developed without departing from the spirit of the invention or from the scope of the appended claims.

We claim:

1. A method for determining the temperature of a combustion flame of known composition comprising:
   a. supporting a thin wire at a preselected position within said flame, said wire selected to rapidly couple energy to the immediately surrounding gases of said flame when said wire is heated;
   b. directing a first pulsed laser beam onto said wire to produce localized heating of said wire and the immediately surrounding gases of said flame whereby a pressure increase in the form of an acoustic pulse is generated within said flame;
   c. directing parallel second and third laser beams through said flame in predetermined spaced relationship to each other and to said wire;
   d. detecting the respective deflections of said second and third laser beams resulting from interactions thereof with said acoustic pulse;
   e. measuring the time difference between respective said deflections of said second and third laser beams to determine the speed of said acoustic pulse through said flame; and
   f. determining the temperature of said flame from said speed determination and said predetermined spaced relationship between said second and third laser beams.

2. The method as recited in claim 1 wherein said first laser beam is produced by a low power pulsed Nd:YAG laser.

3. The method as recited in claim 1 wherein said second and third laser beams are produced by HeNe lasers.

4. The method as recited in claim 1 wherein said wire comprises a material selected from the group consisting of tungsten, titanium, aluminum titanium alloy, nickel, stainless steel, copper, brass, and aluminum.

5. A system for determining the temperature of a combustion flame of known composition comprising:
   a. a thin wire for placement at a predetermined location within said flame, said wire selected to rapidly couple energy to the immediately surrounding gases of said flame when said wire is heated;
   b. a first pulsed laser source for directing a first pulsed laser beam onto said wire for heating said wire and the immediately surrounding gases of said flame to produce an acoustic pulse within said flame;
   c. second and third laser sources for directing parallel second and third laser beams through said flame in predetermined spaced relationship to each other and to said wire;
   d. means for detecting the respective deflections of said second and third laser beams resulting from interactions thereof with said acoustic pulse; and
   e. means for measuring the time difference between respective said deflections of said second and third laser beams to determine the speed of said acoustic pulse through said flame and the temperature of said flame from said speed determination and said predetermined spaced relationship between said second and third laser beams.

6. The system as recited in claim 5 wherein said first laser source comprises a low power pulsed Nd:YAG laser.

7. The system as recited in claim 5 wherein said second and third laser sources comprise HeNe lasers.

8. The system as recited in claim 5 wherein said wire comprises a material selected from the group consisting of tungsten, titanium, aluminum titanium alloy, nickel, stainless steel, copper, brass, and aluminum.

9. The system as recited in claim 5 wherein said first laser source has predetermined pulse rate.

10. A method for determining the temperature of a combustion flame of known composition comprising:
   a. supporting a thin wire at a preselected position within said flame, said wire selected to rapidly couple energy to the immediately surrounding gases of said flame when said wire is heated;
   b. directing a first pulsed laser beam onto said wire to produce localized heating of said wire and the immediately surrounding gases of said flame whereby a pressure increase in the form of an acoustic pulse is generated within said flame;
   c. directing parallel second and third laser beams through said flame in predetermined spaced relationship to each other and to said wire;
   d. detecting the respective deflections of said second and third laser beams resulting from interactions thereof with said acoustic pulse;
   e. measuring the time difference between respective said deflections of said second and third laser beams to determine the speed of said acoustic pulse between said second and third laser beams;
   f. performing the foregoing steps a through e in air at ambient conditions with said flame removed;
   g. comparing the measurements taken in the presence of said flame with the measurements taken in ambient air; and
   h. determining the temperature of said flame from said speed determinations and said predetermined spaced relationship between said second and third laser beams.

11. The method as recited in claim 10 wherein said first laser beam is produced by a low power pulsed Nd:YAG laser.

12. The method as recited in claim 10 wherein said second and third laser beams are produced by HeNe lasers.

13. The method as recited in claim 10 wherein said wire comprises a material selected from the group consisting of tungsten, titanium, aluminum titanium alloy, nickel, stainless steel, copper, brass, and aluminum.

* * * * *